United States Patent
Rune et al.

(10) Patent No.: US 10,178,620 B2
(45) Date of Patent: Jan. 8, 2019

(54) METHODS AND DEVICES FOR ENABLING RECEPTION OF BEAM SWEEP TRANSMISSIONS

(71) Applicant: Telefonaktiebolaget LM Ericsson (publ), Stockholm (SE)

(72) Inventors: Johan Rune, Lidingö (SE); Jose Luis Pradas, Stockholm (SE); Andres Reial, Malmö (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 121 days.

(21) Appl. No.: 15/125,620

(22) PCT Filed: May 13, 2016

(86) PCT No.: PCT/SE2016/050435
§ 371 (c)(1),
(2) Date: Sep. 13, 2016

(87) PCT Pub. No.: WO2017/196219
PCT Pub. Date: Nov. 16, 2017

(65) Prior Publication Data
US 2018/0124703 A1    May 3, 2018

(51) Int. Cl.
G08C 17/00 (2006.01)
H04W 52/02 (2009.01)
H04B 7/06 (2006.01)

(52) U.S. Cl.
CPC ...... *H04W 52/0229* (2013.01); *H04B 7/0617* (2013.01); *H04W 52/0216* (2013.01); *H04W 52/0254* (2013.01); *Y02D 70/10* (2018.01)

(58) Field of Classification Search
CPC ......... H04W 52/0229; H04W 52/0254; H04W 72/0446; H04W 72/046; H04W 72/085;
(Continued)

(56) References Cited

U.S. PATENT DOCUMENTS

2004/0203905 A1\* 10/2004 Cuffaro ............... G01S 5/02
455/456.1
2015/0358129 A1\* 12/2015 Ryu ............... H04L 5/0023
455/438

(Continued)

OTHER PUBLICATIONS

Kwon, Sang-Wook et al., "Performance Analysis of DRX Mechanism Considering Analogue Beamforming in Millimeter-Wave Mobile Broadband System", Globecom 2014 Workshop, Emerging Technologies for 5G Wireless Cellular Networks, Dec. 2014, pp. 802-807.

*Primary Examiner* — Abdelnabi O Musa
(74) *Attorney, Agent, or Firm* — Murphy, Bilak & Homiller, PLLC

(57) ABSTRACT

There is disclosed a method performed by a wireless communication device 100 to enable the reception of a beam sweep transmission. The method comprises obtaining S1 information enabling said wireless communication device 100 to determine whether it is stationary, or essentially stationary. The method also comprises acquiring S2 configuration information comprising information about the starting time for the beam sweep transmission. The method also comprises determining S3 a time when to initiate a reception of the beam sweep transmission based at least partially on the obtained information and the acquired configuration information, thereby allowing said wireless communication device to enter, or remain in, a first activity state until the determined time. The method also comprises entering S4, at the determined time, a second activity state whereby said wireless communication device is capable to receive the beam sweep. There is also disclosed a complementary method performed by a radio network node as well as corresponding devices and computer programs.

28 Claims, 7 Drawing Sheets

(58) Field of Classification Search
CPC ..... H04W 88/08; H04B 7/0617; H04B 7/088; H04B 7/0695
See application file for complete search history.

(56) References Cited

U.S. PATENT DOCUMENTS

2015/0382334 A1* 12/2015 El Ayach .............. H04W 16/28
370/336
2016/0191132 A1* 6/2016 Rajagopal .............. H04B 7/088
370/329

* cited by examiner

METHODS AND DEVICES FOR ENABLING RECEPTION OF BEAM SWEEP TRANSMISSIONS

TECHNICAL FIELD

The proposed technology generally relates to methods and devices that enables reception beam sweep transmissions. In particular it relates to methods and devices that enable a wireless communication device to utilize an energy saving mode of operation while at the same time ensuring a reliable reception of beam sweep transmissions.

BACKGROUND

The spectrum for 5G/NX systems is generally expected to be allocated in higher frequency bands than the spectrum for today's cellular systems, even in the millimeter wave region. At these high frequencies, the propagation conditions, in terms of attenuation, penetration and refraction, are not as favorable for wireless communications as the lower frequencies utilized today. To overcome these problems, 5G/NX systems are assumed to rely heavily on beamforming in order to more efficiently direct the radiated energy towards the intended receiver. This has the great advantage that the coverage area can be increased, but it is also associated with problems, since the reliance on beamforming prevents an access node from reaching its entire intended coverage area, unless access nodes are deployed densely enough to compensate for the poor propagation conditions.

Because of the above circumstances, an access node transmitting a signal may transmit the signal using a single omnidirectional transmission, transmit it using a few consecutive wide beams, which together covering the entire coverage area, or using a potentially great number of consecutive narrow beams. In the general case, multiple consecutively transmitted narrow beams can be assumed to be used, this is referred to as a beam sweep.

Discontinuous Reception, DRX, is a possible way to enable a wireless communication device to save energy by staying in a low-power sleep mode most of the time and only wake up to receive certain signals, such as signals carrying tracking area information, monitor paging occasions and perform measurements.

Having as short awake periods as possible is crucial to make the DRX efficient and the energy consumption low. In the context of e.g. reception of tracking area information, short awake periods can be achieved if the occasions when the signal is transmitted are well defined. However, in the case where this information is transmitted using beam sweeps, the time to receive the signal is inherently vaguely defined, because it is unknown which of the beams in the beam sweep the wireless communication device will be able to receive. The result is that the signal transmission/reception occasion is extended to a longer time window that covers the entire beam sweep duration. Hence, because of the need for beam sweeping, the awake time periods when using DRX become much longer than required for reception of a single transmission. This can potentially severely degrade the performance of the DRX and significantly increase the energy consumption, which is especially unfavorable for energy deprived devices, such as many MTC devices, e.g. sensor devices.

The proposed technology aims to provide counter measures to the interconnected problems of beam sweep transmissions and energy deprivation of potentially receiving devices. It aims in particular to provide mechanisms whereby a wireless communication device can save energy, or power, and at the same time receive information transmitted to the device using beam sweep transmissions.

SUMMARY

It is an object to provide methods and devices that enables a wireless communication device to receive information transmitted during a beam sweep transmission. Another object is to provide methods and devices that enable a wireless communication device to perform an energy efficient reception of information transmitted using beam sweep transmissions.

According to a first aspect, there is provided a method performed by a wireless communication device to enable the reception of a beam sweep transmission. The method comprises obtaining information enabling the wireless communication device to determine whether it is stationary, or essentially stationary. The method also comprises acquiring configuration information comprising information about the starting time for the beam sweep transmission. The method also comprises determining a time, when to initiate a reception of the beam sweep transmission based at least partially on the obtained information and the acquired configuration information, thereby allowing the wireless communication device to enter or remain in a first activity state until the determined time. The method also comprises entering, at the determined time, a second activity state whereby the wireless communication device is capable to receive the beam sweep.

According to a second aspect there is provided a transmission method performed by a radio network node to enable a wireless communication device to receive information transmitted from the radio network node in a beam sweep transmission, wherein the wireless device is in at least one of an idle state, a dormant state, an energy saving state and a non-receiving state. The method comprises transmitting configuration information to the wireless communication device, the configuration information comprising at least the starting time for the beam sweep transmission. The method also comprises transmitting information to be received by the wireless communication device in a beam sweep transmission at the transmitted starting time.

According to a third aspect there is provided a wireless communication device configured to receive information transmitted during a beam sweep transmission. The wireless communication device is configured to obtain information enabling the wireless communication device to determine whether it is stationary or essentially stationary. The wireless communication device is also configured to acquire configuration information comprising information about the starting time for the beam sweep transmission. The wireless communication device is also configured to determine a time to initiate a reception of the beam sweep transmission based at least partially on the obtained information and the acquired configuration information thereby allowing the wireless communication device to enter or remain in a first activity state until the determined time. The wireless communication device is also configured to enter, at the determined time, a second activity state whereby the wireless communication device is capable to receive the beam sweep.

According to a fourth aspect there is provided a radio network node configured to transmit configuration information enabling a wireless communication device to receive information transmitted from the radio network node in a beam sweep transmission, wherein the wireless device is in at least one of an idle state, a dormant state, an energy saving state and a non-receiving state. The radio network node is configured to transmit configuration information to the wireless communication device, the configuration information comprising at least the starting time for the beam sweep transmission. The radio network node is also configured transmit information to be received by the wireless communication device in a beam sweep transmission at the transmitted starting time.

According to a fifth aspect there is provided a computer program which, when executed by at least one processor, controls the reception of a beam sweep transmission, wherein the computer program comprises instructions that cause the at least one processor to:

read information for determining whether a wireless communication device is stationary, or essentially stationary read configuration information comprising information about the starting time for a beam sweep transmission determining a time to initiate a reception of the beam sweep transmission based at least partially on the information for determining whether a wireless communication device is stationary, or essentially stationary, and the acquired configuration information, and initiate a reception of the beam sweep transmission at the determined time.

According to a sixth aspect there is provided an apparatus for controlling a reception of a beam sweep transmission. The apparatus comprises a reading module for reading information for determining whether a wireless communication device is stationary, or essentially stationary. The apparatus also comprises a reading module for reading configuration information comprising information about the starting time for the beam sweep transmission. The apparatus also comprises a processing module for determining a time to initiate a reception of the beam sweep transmission based at least partially on the information for determining whether a wireless communication device is stationary, or essentially stationary, and the acquired configuration information. The apparatus also comprises an initiation module for initiating a reception of the beam sweep transmission at the determined time.

Embodiments of the proposed technology make it possible to have a secure and reliable mode of operation for receiving information transmitted in a beam sweep transmission. At the same time the proposed technology provides mechanisms that enable a wireless communication device to save energy during times when no reception is expected. The proposed technology reduces the number of beam transmission periods that a more or less stationary wireless communication device need to monitor from many tens down to a single one. The proposed technology allows in particular that the expected large portion of 5G/NX devices that will be stationary to reduce the time to stay awake for reception of e.g. location/area related signal such as Tracking Area Code, TAC, in Long Term Evolution system, thereby improving the efficiency of the DRX mode and substantially improving the energy efficiency of the wireless communication device. Saving energy in devices that are essentially stationary is a particularly beneficial application, since energy-deprived MTC devices, e.g. sensor devices, are expected to represent a very large part of the stationary 5G/NX UEs.

Other advantages will be appreciated when reading the detailed description.

BRIEF DESCRIPTION OF THE DRAWINGS

The embodiments, together with further objects and advantages thereof, may best be understood by making reference to the following description taken together with the accompanying drawings, in which.

DETAILED DESCRIPTION

Throughout the drawings, the same reference designations are used for similar or corresponding elements.

For a better understanding of the proposed technology, it may be useful to begin with a brief system overview and an analysis of the technical problem.

In 5G wireless communication networks, the carrier frequencies are expected to be very high. At these high carrier frequencies significant propagation losses will occur. The free-propagation losses will increase due to e.g., scattering, penetration and refraction. A particular way to counter the problem of propagation losses is to use beamforming. In beamforming a signal is transmitted in a particular direction, in order to increase the received signal energy at the receiving device. In transmissions using beamforming a wireless device generates signals to be transmitted in different directions, i.e. beam directions. The transmitting device transmit these signals in a number of possible beam directions, the particular number depends on the capacity of the device. A transmitting device may in particular transmit signals using omnidirectional transmission, a short sweep of wide beams or a long sweep of narrow beams, or anything in between, depending on the deployment/coverage scenario. The receiving device aims to detect the transmitted signals. Since the receiving device does not know the explicit time when to receive signals transmitted by means of beam sweeping, since it is unknown which of the beams in the beam sweep the receiving device is capable receive, the receiving device will need be in reception mode during a large part, or possible the entire duration, of the beam sweep window in order to be able to securely receive the transmitted information. The result is that the wireless communication device needs to be awake, i.e. in receiving mode, for time periods that are much longer than the ones required for reception of a single transmission. This will in turn negatively affect the receiving device potential to save energy by entering an energy saving mode or state. If an energy saving mode was entered during a beam sweep transmission window there is a risk that relevant information was not received. The proposed technology aims to provide mechanisms whereby a receiving device safely may enter, or remain in, an energy saving mode, e.g. a non-receiving mode or non-receiving state, while at the same time being certain that relevant information transmitted during the beam sweep is safely received. The method thus enables the wireless communication device to enter or remain in an energy saving low activity state or mode during most of the beam sweep, only to wake up or entering a higher activity state or receiving mode when the time approaches for reception of the signal in the beam sweep, whereupon it may then go back to the lower activity state again after reception of the signal.

Figure 1:
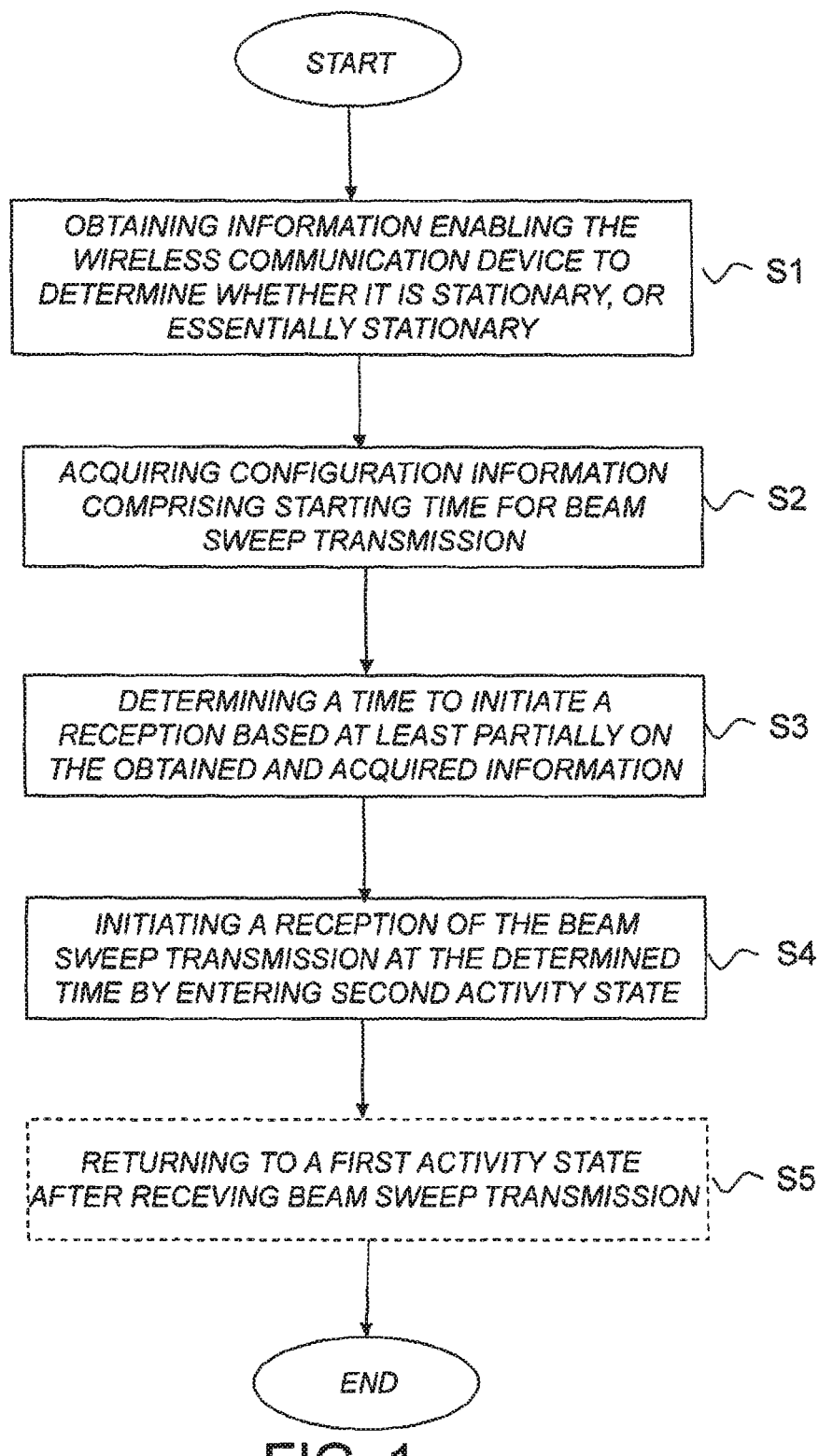
FIG. 1 is a schematic flow diagram illustrating a particular method performed by a wireless communication device according to the proposed technology.

A particular mechanism that ensures that the mentioned features can be obtained is provided by a method according to the proposed technology. FIG. 1 is a schematic flow diagram illustrating an example of the method. It is in particular disclosed a method performed by a wireless communication device 100 to enable the reception of a beam sweep transmission. A beam sweep is a series of multiple consecutively transmitted narrow beams transmitted in slightly different directions to span the entire intended coverage area. A beam sweep transmission is the transmission of an information signal using a beam sweep in which the wireless device is receiving the signal through one or several of the beams in the beam sweep. The method performed by a wireless communication device 100 to enable the reception of a beam sweep transmission comprises obtaining S1 information enabling the wireless communication device 100 to determine whether it is stationary, or essentially stationary. The method also comprises acquiring S2 configuration information comprising information about the starting time for the beam sweep transmission. The method also comprises determining S3 a time when to initiate a reception of the beam sweep transmission based at least partially on the obtained information and the acquired configuration information, thereby allowing the wireless communication device to enter, or remain in, a first activity state until the determined time. The method also comprises entering S4, at the determined time, a second activity state whereby the wireless communication device is capable to receive the beam sweep. The wireless device thus switches from the first activity state to the second activity state at the determined time. The method may further comprise returning S5, after reception of the transmitted beam sweep, i.e. after reception of the signal transmitted in the beam sweep, to the first activity state.

The proposed method provides a mechanism whereby a wireless communication device is able to determine a time when to initiate reception of a beam sweep transmission. The fact that such a time can be determined makes it possible for the wireless device to switch between different activity states. This will in turn ensure that the device may go to sleep, i.e. entering a low energy consuming state, during time periods when no reception is expected. At the determined time the device may wake up and enter a second activity state in which the device is capable to receive the beam sweep transmission, and then after reception return to or reenter the first lower energy consuming activity state. The proposed technology therefore enables a highly energy saving operation.

The time to initiate the reception is determined based on at least configuration information comprising the starting time for the beam sweep transmission and information whether the wireless communication device is stationary, or subject to minor movements, i.e. essentially stationary. The configuration information and the information allowing the wireless communication device to determine whether it is stationary, or essentially stationary, can be obtained by the device in any order. The configuration information could, according to particular embodiments of the method, be acquired S2 or obtained from information transmitted from either the beam sweep transmitting node or some other node in the network that may control or monitor the scheduling of the beam sweep transmissions within the network. The wireless communication device may also be pre-configured with the configuration information, whereby the device can acquire it from its configuration settings, this may for example be the case when periodic beam sweep transmissions are performed, successive beam sweep transmissions beginning at approximately the same time and using approximately the same beam sweep directions.

The information allowing the wireless communication device to determine whether it is stationary, or essentially stationary, can be obtained S1 in numerous ways to be described later. There will in particular be described certain embodiments that illustrates how the method may collect and utilize information about earlier received beam sweep transmissions in order to determine whether it is stationary or not.

The proposed method also comprises the step S3 of determining a time when to initiate a reception of the beam sweep transmission. The method may in certain embodiments begin by determining whether it is stationary, or nearly stationary. If it is the case that the wireless communication is essentially or nearly stationary the method may proceed and either determine S3 the time by using the starting time as acquired with the configuration information or some time offset from the acquired starting time. If the wireless device is not determined to be stationary or essentially stationary, the time is determined S3 to be the acquired starting time of the beam sweep transmission. Certain examples of this will be described in later section. Having determined S3 a reception time, the wireless communication device may enter or remain in a first activity state until it is time to initiate a reception by entering a second activity state where reception is enabled. The first activity state may preferably be a low energy consuming state, such as an idle state or mode, a dormant state or mode or a non-receiving state or mode. The second activity state is typically a higher energy consuming state than the first state, a receiving state in which reception of the signal transmitted in the beam sweep is possible.

A particular embodiment of the proposed technology therefore provides a method, wherein the first activity state is at least one of an idle state, a dormant state, an energy saving state and a non-receiving state and wherein the second activity state is a receiving state. According to this embodiment a wireless communication device determines S3 a time when to initiate a reception of the beam sweep transmission. This could optionally be done when the wireless communication device is in a receiving state, or equivalently when in receiving mode, it may however also be in a non-receiving state. After having determined the particular time, by utilizing the obtained information about the stationarity of the device, and the acquired configuration information, such as the starting time of the beam sweep transmission, the wireless communication device may enter or remain in a first activity state that has a reduced energy consumption. The device may remain in this energy saving state or mode until the time for initiating a reception approaches. At this time the wireless communication device enters a second activity state where reception of beam sweep transmissions is enabled. After reception of the beam sweep transmission the wireless communication device could return to the first activity state, and could remain in this state until a new time for a second or further beam sweep, periodic or non-periodic, is determined. This embodiment provides a particularly efficient way to reduce the energy consumption of the wireless communication device by switching between a lower and a higher energy consumption state, while at the same time ensuring that information is securely received.

Another particular embodiment of the proposed technology provides a method that comprises acquiring S2 configuration information by receiving a message comprising the configuration information. The message could, for example, be sent by means of a signal transmitted at some lower frequency than the frequency used for the beam sweep transmission. By way of example, the acquired configuration information could be received in a message transmitted from the radio network node transmitting the beam sweep transmission. The configuration information could comprise information about the starting time for the beam sweep transmission. The configuration information could also include information about the sequence of beams used in the beam sweep, or other information helping the wireless communication device to determine a time when a beam in the beam sweep transmission will reach the device, i.e. a time when the device will be able to receive the signal and information transmitted in the beam sweep transmission.

Still another embodiment of the proposed technology relates to a method wherein the step of determining S3 a time to initiate a reception of the beam sweep transmission is performed differently if the wireless communication device has been determined to be stationary, or essentially stationary compared to non-stationary or mobile. If the wireless device is not determined to be stationary or essentially stationary, the time will be determined S3 to be the starting time of the beam sweep transmission as acquired in the configuration information. If the device is determined S1 to be stationary or essentially stationary, then the time will be determined S3 to either be the starting time of the beam sweep transmission as acquired in the configuration information, e.g. when the wireless communication device is reached by one of the first beams in the beam sweep transmission, or a later time occurring after the starting time of the beam sweep transmission. The later time may then be determined S3 according to knowledge about the sequence of beams in the beam sweep transmission, knowledge about the position of the node and the wireless device itself or other information allowing the wireless device to determine the time at which a beam in the beam sweep transmission will reach the wireless communication device, or by calculating a time offset between the reception time of a beam in an earlier beam sweep transmission from the same network node and the starting time of the beam sweep transmission. The wireless communication device may determine S3 the time of reception of a beam in a beam sweep transmission by monitoring the full beam sweep transmission, registering or recording the reception time of the beam in the beam sweep transmission and then calculating a time offset between the beam sweep starting time and the beam reception time, and determining S3 the reception time based on the time offset. Optionally the wireless device uses information already obtained regarding the timing offset, e.g. from an earlier beam sweep transmission, and uses the information to determine S3 a starting time for reception of a beam sweep transmission.

The method also comprises entering S4, at the determined time, a second activity state whereby the wireless communication device is capable to receive the beam sweep. The wireless communication device may enter the second activity state at the determined time, or slightly before. For example, a guard period or similar might be entered before the determined time for reception of a beam in the beam sweep, and the wireless communication device might enter the second activity state at the beginning of the guard period. The duration of the guard period could for example be set to be a fraction of the transmission window for a particular direction of a beam in the beam sweep. The specific length of the guard interval may for example be set to $\frac{1}{20}$ to $\frac{1}{3}$ of the transmission window for a particular direction.

The proposed technology also provides an embodiment wherein the method further comprises determining S3 a time to initiate a reception of the beam sweep transmission further comprises registering the time of reception of the information transmitted during the beam sweep transmission. This could preferably be done if the wireless communication device has been determined to be stationary, or essentially stationary. That is, the particular time of reception when a wireless communication device actually received the information transmitted during the beam sweep transmission is registered. The registered time of reception may be used in different embodiment to further improve the proposed technology.

According to a possible embodiment of the proposed technology there is provided a method wherein the step of determining S3 a time to initiate a reception of the beam sweep transmission is based on the time of reception of information transmitted during an earlier beam sweep transmission. That is, knowledge about the reception time of earlier received beam sweep transmission is used as the time when to initiate a reception by entering S4 the second activity state.

In one such embodiment the registered time is used in order to find the difference between the actual reception time and the acquired time, this can be used to improve the step of determining a time in which reception is initiated by entering a second activity state. To this end the embodiment provides a method wherein the step of determining also comprises comparing the registered time of reception with the acquired starting time for the beam sweep transmission in order to obtain a measure of the time offset between the reception time and the acquired starting time.

Another embodiment that utilizes the registered time relates to a method wherein a time for initiating a reception of a subsequent beam sweep transmission is determined based at least partially on the measure of the time offset between the reception time and the acquired starting time of an earlier received beam sweep transmission.

As a highly simplified example, one may consider the case where wireless communication device in step S3 determines that the time to initiate the reception coincides with starting time acquired by means of the configuration information. If the reception mode or reception state, i.e. the second activity state, is entered at the determined time and if the actual reception time, as registered, occurred at a later time, the particular offset between the times may be used to improve the determination of the time to initiate a reception. If for example the configuration information provides information that a particular beam sweep transmission will begin at time T0, and then be repeated at T1, T2, T3, etc., and if the registered receiving time yields information that the information was received at T0+t*, the time offset measure can be determined to be t*. This can be used to improve the accuracy of future reception time determinations. The next determined time for entering the second activity state may for example be set to T1+½t*. This scheme may be repeated several times in order to obtain better and better values for the determined time. Having performed the process a number of times to obtain a number of time offset measures one may process the time offsets statistically to obtain a reasonable measure to use for future receptions. A particular example would be to use the mean value of all the determined time offsets.

According to still another embodiment where the registered reception time is used provides a method, wherein the step of obtaining S1 information comprises to obtain a measure of the time offset for at least two different receptions to enable the wireless communication device 100 to determine whether it is stationary based on a comparison between the measures of the time offset.

That is, information that time offsets obtained during the different receptions differ may be used to determine whether the wireless communication device is stationary or not. The fact that the time offsets more or less coincides provides as a clear indication that the wireless communication device is stationary, while substantially differing time offsets provides ample indications that the device is in fact not stationary. It should be noted that the communication device can be considered to be stationary as long as the relevant beam sweep transmission is actually received. A wireless communication device may therefore be allowed to move slightly as long as the time offset compensate for the slight motion.

Beside the use of time offsets to determine whether the wireless communication device is stationary the proposed technology provides for a number of different possibilities to determine the stationarity of the device. The device is determined to be stationary or essentially stationary by evaluating information obtained or available to the wireless device. The device will then receive the beam sweep transmission, such as one or a few beams of the beam sweep, essentially at the same time in relation to the starting time of the beam sweep for consecutive beam sweeps.

There is in particular provided a method, wherein the step of obtaining S1 information comprises to obtain information in the form of one or more of the following:
 information about the output from a sensor device providing information about the position of the wireless device to enable the wireless communication device 100 to determine that is stationary by checking that the output is essentially constant,
 information related to hand-overs of the wireless communication device 100 to enable the wireless communication device 100 to determine that it is stationary by checking whether it has subjected to a handover during a predetermined time period,
 information relating to estimations of certain channel properties, such as dispersion or delay profile, to enable the wireless communication device 100 to determine that it is stationary by checking if these channel properties have remain constant during a predetermined time period,
 information relating to estimations of a Doppler spread to enable the wireless communication device 100 to determined that it is stationary by checking whether the estimations indicate a Doppler spread that is essentially zero,
 information about the geographical position of the wireless communication device 100 provided by a UE-internal GPS receiver to enable the wireless communication device 100 to determine whether it is stationary by checking if the information provides indications that the geographical position have remained constant during a predetermined time period.

All the above listed information sources may advantageously be combined in basically any combination. Which information sources to use and the degree of certainty that is required is up to the particular implementation.

The method according to the proposed technology can suitable be used for the case where the information received in the beam sweep transmission comprises system information, paging information or other information that the wireless communication device needs to monitor when in the first activity state.

According to a particularly useful embodiment of the proposed there is provided a method wherein the information received during the beam sweep transmission comprises tracking area information instructing the wireless communication device 100 to perform a tracking area update.

The proposed technology also provides an embodiment of the method, wherein the acquired configuration information also comprises information about the sequence of beams used in the beam sweep transmission.

According to yet another embodiment of the proposed technology there is provided a method wherein the beam sweep transmission is a periodic beam sweep transmission. This particular embodiment of the proposed technology addresses deployments where the transmitting radio network node performs periodic beam sweep transmissions at a predetermined/preconfigured time and using the same sequence of beams. That is, different transmit directions are always covered in the same order in the sweep. Such examples are when the node is transmitting system information, paging information, tracking area information or any other information that the wireless communication device needs to monitor even when it is in a low energy or non-receiving state. This kind of information is typically transmitted with a certain periodicity and with a similar or identical beam sweep. The wireless communication device might thus obtain a periodic series of starting times for beam sweep transmissions of such information and using the method of the invention be able to determine a time to receive the transmissions based on a previously known or determined time offset. The wireless communication device may thus be able to wake up or enter a higher activity state for a shorter period of time than it would if it were to monitor the whole beam sweep transmission window, and is thus able to decrease its energy consumption.

A particularly useful embodiment when the beam sweep transmission is a periodic beam sweep transmission is provided by a method wherein the acquired configuration information further comprises the periodicity of said periodic beam sweep transmission. The information may be acquired in several ways, the wireless communication device may have received the information in a message transmitted from the beam sweep transmitting node, or some other transmission controlling node within the network. The device may also been provided with control information enabling the device control its setting to account for the periodicity. An example of a particular use of an embodiment where information about the periodicity is used relates to a case where the reception time of a beam sweep transmission is determined S3 to be t+T, where t refers to the registered time of reception for an earlier beam sweep, and T refers to the period of the periodic beam sweep transmission. A reception of the beam sweep transmission may thus be initiated at t+T by entering S4 the second activity state. This embodiment may also be altered to take time offsets and guard interval, as described earlier, into account.

In case of a periodic beam sweep transmission, the proposed technology also provides a possible embodiment of a method wherein the method comprises determining S3 a sequence of times when to initiate reception of beam sweep transmissions based on the obtained information and the acquired configuration information and on the periodicity of the beam sweep transmissions. That is, if a periodic beam sweep transmission is used, the method may proceed and determine a sequence of times when to initiate a reception by entering a second activity state where the wireless communication device is capable of receiving the beam sweep transmission. The method may in particular determine a first time by means of the obtained and acquired information and having determined the first time a sequence of times may be obtained since the starting times for the beam transmissions follows a repetitive pattern. Hence a sequence of times may be obtained by knowing the period between two successive transmissions and optionally a potential time offset. More of this will be described later.

The embodiment where a sequence of times are determined provides for a way whereby a wireless communication device is allowed to automatically swift between a first activity state with e.g. a low energy consumption and a second activity state where the wireless communication device is capable of receiving the beam sweep transmission. As a concrete but non-limiting example the wireless communication device may initially be in the second activity state, or at least in a state allowing reception. Since the wireless communication device is capable of receiving information when in the second state, the wireless communication device is allowed to acquire configuration information transmitted from e.g. the beam sweep transmitting node. The wireless communication device may use this information together with knowledge that it is essentially stationary in order to determine a first time when to initiate reception by shifting activity states. The knowledge of this particular time together with knowledge about the periodicity of the beam sweep transmission will enable the device to determine a number of times when to initiate a reception of the beam sweep transmission. Having determined a particular sequence the wireless communication device may enter a first activity state, e.g. a low energy consuming state such as a non-receiving state. When the first determined time approaches the wireless communication device initiates a reception by entering the second activity state where reception is enabled. The device receives and may decode the information, and if the content of the same allows it, the device may return to the first activity state and remain there until the next determined time in the sequence approaches. This process may continue until configurations regarding either the beam sweep transmissions or the stationarity of the device is altered.

To illustrate this consider the case with a Long Term Evolution network, LTE network. In LTE, tracking is a functionality which supports locating wireless devices, e.g. User Equipments, UEs, within the network. The network is broken down into Tracking Areas, TAs. The network configures a UE in idle mode, a particular low activity mode, with one or more tracking areas. This allows the network to locate the UE within a certain defined region. When the UE enters a tracking area which is not in the list provided by the network, the UE performs a tracking area update. This update assists the network to update the UE location information, which enables the network to contact the UE through paging when needed.

The method to indicate the tracking area is via system information. In LTE, the Tracking Area Code, TAC, is contained in System Information Block Type 1, SIB1, which is periodically transmitted in each cell.

A UE in idle mode has to monitor the TAC, i.e. SIB1, in order to detect when a tracking area update is needed. Tracking are information such as TAC will certainly be relevant also in 5G network, and the proposed technology is ideally suited to handle the transmission and reception of this type of information using beam sweep transmissions.

We will now provide a few examples of how the proposed technology may be used in certain applications. The provided examples are merely intended to illuminate certain aspects of the proposed technology and should not be considered as limitations.

In a first example the proposed technology targets the subset of the wireless communication devices that are stationary. Since a large portion of the envisioned 5G/NX devices are expected to be stationary, e.g. mass-deployed sensor devices, a mechanism targeting this subset would be highly beneficial. Furthermore, energy conservation is of particular importance in such devices, due to e.g. the limited battery power of a sensor. The first example also targets the scenario where the beam sweep transmission transmits tracking area information via a tracking area signal, referred to below as a TRAS.

An access node transmitting a TRAS by means of a beam sweep transmission may transmit it using omnidirectional transmission, a short sweep of wide beams or a long sweep of narrow beams, or anything in between really, depending on the deployment/coverage scenario. The proposed technology may address deployments where the access node always begins a periodic TRAS transmissions, e.g. an omnidirectional transmission with either a short sweep or a long sweep, at a predetermined/preconfigured time and always uses the same sequence of beams. That is, different directions are always covered in the same order, in the sweep. A wireless communication device, such as a UE in Dormant mode may be configured with knowledge of this periodic transmission start time, as well as the maximum beam sweep time.

A particular feature of the proposed technology is that a stationary UE may obtain knowledge of its stationary property, through any of the number of possible mechanisms described earlier, and may record the time offset after the configured TRAS transmission start time that it receives the TRAS. Based on such detection, or several repeated measurements indicating substantially the same time of reception in relation to the configured transmission start time, the UE learns when it can expect to receive the periodic TRAS and may delay its wakeup time accordingly.

The proposed technology may utilize the stationary property of the UE, i.e. the lack of physical movement of the device during an extended period, and relies on the UE to obtain knowledge about this property. In addition, according to a particular example, a UE in Dormant state is configured with the start time of a window, and also possibly the length of the window, for TRAS reception rather than a single occasion for reception of a single TRAS transmission. As discussed, depending on deployment, that is the coverage scenarios, the TRAS may be transmitted in an omnidirectional fashion, using a sweep of wide beams or using a sweep of narrow beams. According to the particular example with periodic beam sweeps, the transmitting access node should always start the beam sweep, or the omnidirectional transmission, at the same preconfigured time, i.e. at a time instant corresponding to a multiple of TRAS transmission period, plus an optional fixed offset, according to the system clock.

Under the assumption that the UE is configured with the same time, the UE does not have to know beforehand whether it will be covered by omnidirectional transmission, a sweep of wide beams or a sweep of narrow beams, but a consequence is that the UE has to be prepared to receive the TRAS not only at a specific occasion but during a time window starting at the preconfigured time, possibly with some margin to account for clock drift, and ending after a time period corresponding to the longest possible beam sweep. However, as soon as the UE receives the TRAS it may go back to sleep. According to the proposed technology it is also possible that the access node, i.e. the radio network node performing the beam sweep transmission, always uses the same sequence of beams in its TRAS beam sweep transmission. That is, different directions will always be covered in the same order. In such a particular case a UE knowing that it is stationary may use the knowledge to optimize its reception, i.e. optimizing the time period when to be in a receiving state. As a consequence the UE may also increase its sleep time, i.e. increase the time when in an energy saving non-receiving mode or state.

The stationary UE can notice that it always receives the TRAS a certain time after the beginning of the TRAS observation window, which corresponds to a certain beam direction in the sweep. When this is learnt, the UE can adapt its wakeup time accordingly and thus reduce the time it has to stay awake just to wait for the TRAS. Using this principle/mechanism the UE can potentially reduce the time it stays awake to a small fraction, thereby improving the efficiency of the DRX and saving substantial amounts of energy.

The configuration of the UE in terms of TRAS transmission period and time window, or the start of time window, for TRAS transmission could be done when the UE is switched to dormant mode, i.e. a low activity mode. Alternatively the UE could be configured immediately after or in conjunction with establishment of a RRC connection, i.e. when the UE enters active mode, or at any time while the UE is in active mode. Yet another alternative may be that the UE receives this configuration information through the system information.

The proposed method has been described using the example of a physically static wireless communication device. This wireless communication device may e.g. be a sensor device at a fixed location. The principle of the invention may also be applied to wireless communication devices that are temporarily static, e.g. a smartphone placed on a table. Once the wireless communication device is moved after a static phase, it may detect the movement e.g. since the TRAS is detected at a later time instant, or the TRAS is not detected when the UE is waking up just in time according to the previously optimal beam timing. Alternatively, change in any of the other criteria above may be used as an indication that the assumption that the wireless communication device is stationary no longer holds. In such a case, the wireless communication device may return to the standard TRAS reception behavior, attempting TRAS detection during the entire observation window.

Having described a method performed by a wireless communication device to enable the wireless communication device to perform reception of a beam sweep transmission we will now describe a complementary method performed by a radio network node. It should be noted that a radio network node according to the present application may be an access node.

Figure 7:
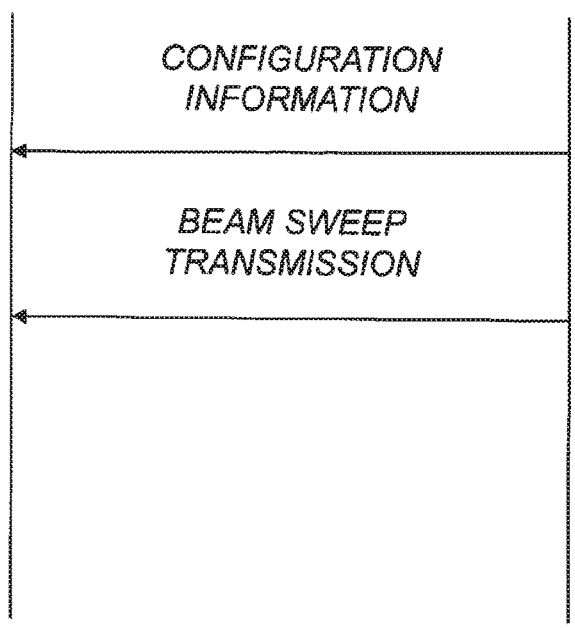
FIG. 7 is a signaling diagram illustrating the cooperation between a wireless communication device and a radio network node according to a particular embodiment of the proposed technology.

The complementary method performed by the radio network node is particularly relevant in an embodiment where the radio network node informs the wireless communication device about the details of an upcoming beam sweep transmission. That is, the radio network node provides the wireless communication device with configuration information that the wireless communication device can use to at least partially determine a time when to initiate a reception by entering an activity state in which it is capable to receive the beam sweep transmission. A signaling diagram illustrating the cooperation is provided by FIG. 7.

Figure 2:
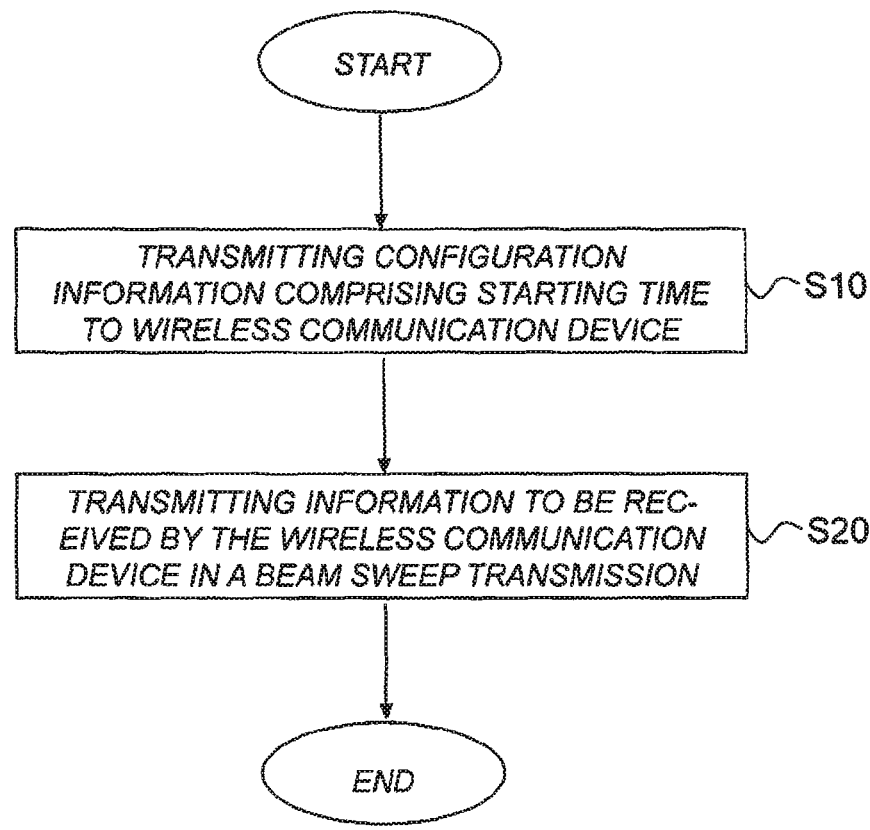
FIG. 2 is a schematic flow diagram illustrating a particular method performed by a radio network node according to the proposed technology.

The method performed by the radio network node is illustrated in FIG. 2. In more detail it is illustrated a method performed by a radio network node 200 for enabling a wireless communication device 100 to receive information transmitted from the radio network node 200 in a beam sweep transmission, the wireless communication device 100 being in at least one of a an idle state, a dormant state, an energy saving state and a non-receiving state. The method comprises transmitting S10 configuration information to the wireless communication device, the configuration information comprising at least the starting time for the beam sweep transmission. The method also comprises transmitting S20 information to be received by the wireless communication device 100 in a beam sweep transmission at the transmitted starting time.

The beam sweep transmission is, according to a particular embodiment of the method, a periodic beam sweep transmission.

According to another possible embodiment of the proposed technology there is provided a method wherein the transmitted S10 configuration information also comprises information about the sequence of beams to be used in the beam sweep transmission and wherein the transmitted S20 information to be received by the wireless device is transmitted in a periodic beam sweep transmission with the sequence of beams.

The complementary aspects of the methods performed by the wireless communication device and the radio network node provides a particularly efficient way to ensure safe reception of information while display the beneficial bonus of allowing a wireless communication device to save energy.

Having described various embodiments of the methods according to the proposed technology, in the following there will be described specific devices apparatuses and computer programs suitable to implement the different methods. All advantages associated to the methods translates to the devices, apparatuses and computer programs and will not be repeated.

According to the proposed technology there is provided a wireless communication device 100 configured to receive information transmitted during a beam sweep transmission. The wireless communication device 100 is configured to obtain information enabling the wireless communication device 100 to determine whether it is stationary, or essentially stationary. The wireless communication device 100 is also configured to acquire configuration information comprising information about the starting time for the beam sweep transmission. The wireless communication device 100 is also configured to determine a time to initiate a reception of the beam sweep transmission based at least partially on the obtained information and the acquired configuration information thereby allowing the wireless communication device to enter, or remain in, a first activity state until the determined time. The wireless communication device 100 is also configured to enter, at the determined time, a second activity state whereby the wireless communication device is capable to receive the beam sweep. The wireless communication device may optionally also be configured to return to the first activity state, after reception of the beam sweep, and could remain in the first activity state until a new time for a second or further periodic beam sweep is determined.

By way of example, in a possible embodiment of the wireless communication device, is the first activity state at least one of an idle state, a dormant state, an energy saving state and a non-receiving state and the second activity state is a receiving state. The first activity state is typically a lower activity state consuming less energy than the second activity state that is typically a higher activity state consuming more energy.

Another possible embodiment provides a wireless communication device 100 that is configured to acquire configuration information by receiving a message comprising the configuration information.

An efficient embodiment of the proposed technology provides a wireless communication device 100 that is configured to acquire the configuration information in a message transmitted from the radio network node 200 transmitting the beam sweep transmission.

Still another embodiment of a wireless communication device provides a wireless communication device that is configured to determine a time to initiate a reception of the beam sweep transmission if the wireless communication device has been determined to be stationary, or essentially stationary.

A possible embodiment of a wireless communication device according to the proposed technology relates to a wireless communication device 100 that is configured to determine a time to initiate a reception of the beam sweep transmission based on the time of reception of information transmitted during an earlier beam sweep transmission.

An advantageous embodiment of the proposed technology provides a wireless communication device 100 that is further configured to register the time of reception of the information transmitted during the beam sweep transmission if the wireless communication device has been determined to be stationary, or essentially stationary A particular version of the advantageous embodiment of the proposed technology provides a wireless communication device 100 that is further configured to compare the registered time of reception with the acquired starting time for the beam sweep transmission in order to obtain a measure of the time offset between the reception time and the acquired starting time.

Another particular version of the advantageous embodiment of the proposed technology provides a wireless communication device 100 that is further configured to determine a time for initiating a reception of a subsequent beam sweep transmission based at least partially on the time offset between the reception time and the acquired starting time of an earlier received beam sweep transmission.

Yet another particular version of the advantageous embodiment of the proposed technology provides a wireless communication device 100 that is configured to obtain information by obtaining a measure of the time offset for at least two different receptions to enable the wireless communication device 100 to determine whether it is stationary based on a comparison between the measures of the time offset.

A particular embodiment of the proposed technology provides a wireless communication device 100 that is configured to obtain information in the form of one or more of the following:
  information about the output from a sensor device providing information about the position of the wireless device to enable the wireless communication device 100 to determine that it is stationary by checking that the output is essentially constant;
  information related to hand-overs of the wireless communication device 100 to enable the wireless communication device 100 to determine that it is stationary by checking whether it has subjected to a handover during a predetermined time period;
  information relating to estimations of certain channel properties, such as dispersion or delay profile, to enable the wireless communication device 100 to determine that it is stationary by checking if these channel properties have remain constant during a predetermined time period;
  information relating to estimations of a Doppler spread to enable the wireless communication device 100 to determined that it is stationary by checking whether the estimations indicate a Doppler spread that is essentially zero;
  information about the geographical position of the wireless communication device 100 provided by a UE-internal GPS receiver to enable the wireless communication device 100 to determine whether it is stationary by checking if the information provides indications that the geographical position have remained constant during a predetermined time period.

A particular embodiment of the proposed technology provides a wireless communication device 100, wherein the information received in the beam sweep transmission comprises system information, paging or other information that the wireless communication device needs to monitor when in the first activity state.

A possible embodiment of the proposed technology provides a wireless communication device 100 wherein the information transmitted during the beam sweep transmission comprises tracking area information instructing the wireless communication device 100 to perform a tracking area update.

Still another possible embodiment of the proposed technology provides a wireless communication device 100 wherein the acquired configuration information also comprises information about the sequence of beams used in the beam sweep transmission.

According to yet another embodiment of the proposed technology there is provided a wireless communication 100, wherein the beam sweep transmission is a periodic beam sweep transmission.

A related embodiment relates to a wireless communication device that is configured to acquire configuration information that comprises the periodicity of said periodic beam sweep transmission.

A possible embodiment of the proposed technology provides a wireless communication device 100 that is further configured to determine a sequence of times when to initiate a reception based on the obtained information and the acquired information and on the periodicity of the beam sweep transmission.

Figure 3:
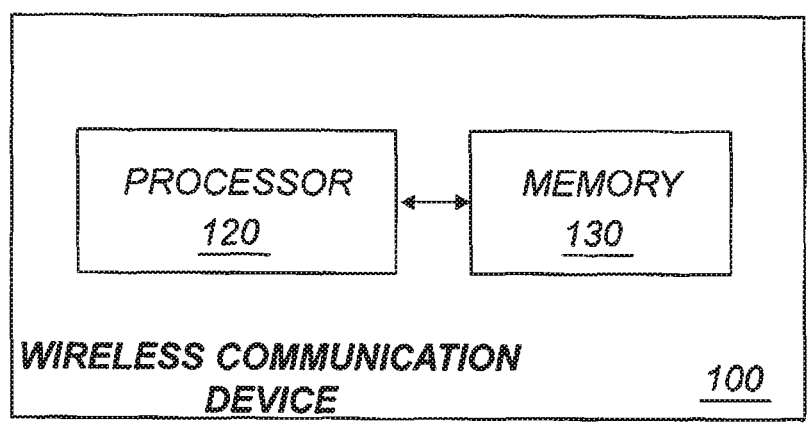
FIG. 3 is a block diagram illustrating a processor-memory implementation of a wireless communication device according to the proposed technology.

FIG. 3 provides a block diagram illustrating a particular version of a wireless communication device 100 according to the proposed technology. The wireless communication device 100 comprises a processor 120 and memory 130, the memory 130 comprising instructions executable by the processor 110, whereby the processor 120 is operative to control a reception of information transmitted during a beam sweep transmission.

Figure 4:
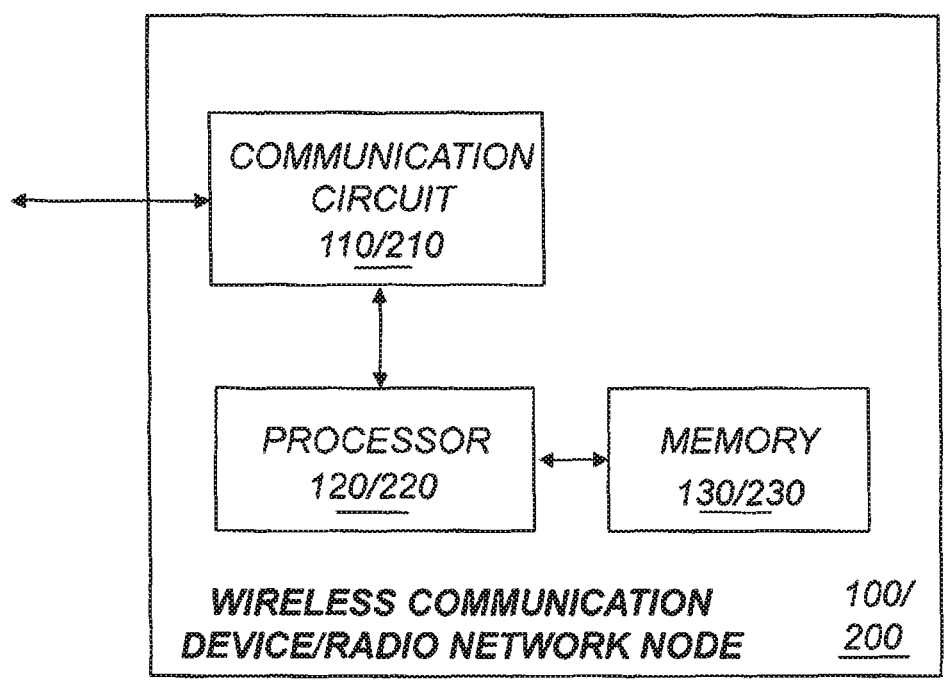
FIG. 4 is a block diagram illustrating a processor-memory implementation of a wireless communication device or a radio network node according to the proposed technology, the block diagram also illustrates a corresponding communication circuit.

FIG. 4 discloses is a wireless communication device 100 that also comprises a communication circuitry 110. The device 100 may also include a communication circuit 110. The communication circuit 110 may include functions for wired and/or wireless communication with other devices and/or network nodes in the network. In a particular example, the communication circuit 110 may be based on radio circuitry for communication with one or more other nodes, including transmitting and/or receiving information. The communication circuit 110 may be interconnected to the processor 120 and/or memory 130. By way of example, the communication circuit 130 may include any of the following: a receiver, a transmitter, a transceiver, input/output (I/O) circuitry, input port(s) and/or output port(s).

It should be notes that, as used herein, the non-limiting terms "wireless communication device", "station", "User Equipment (UE)", and "terminal" may refer to a mobile phone, a cellular phone, a Personal Digital Assistant (FDA), equipped with radio communication capabilities, a smart phone, a laptop or Personal Computer (PC), equipped with an internal or external mobile broadband modem, a tablet with radio communication capabilities, a target device, a device to device UE, a machine type UE or UE capable of machine to machine communication, Customer Premises Equipment (CPE), Laptop Embedded Equipment (LEE), Laptop Mounted Equipment (LME), USB dongle, a portable electronic radio communication device, a sensor device equipped with radio communication capabilities or the like. In particular, the term "wireless communication device" should be interpreted as non-limiting terms comprising any type of wireless device communicating with a network node in a wireless communication system and/or possibly communicating directly with another wireless communication device. In other words, a wireless communication device may be any device equipped with circuitry for wireless communication according to any relevant standard for communication.

The proposed technology also provides a radio network node 200 configured to transmit configuration information enabling a wireless communication device 100 to receive information transmitted from the radio network node in a beam sweep transmission, wherein the wireless device (100) is in at least one of an idle state, a dormant state, an energy saving state and a non-receiving state. The radio network node 200 is configured to transmit configuration information to the wireless communication device 100, the configuration information comprising at least the starting time for the beam sweep transmission. The radio network node 200 is also configured transmit information to be received by the wireless communication device 100 in a beam sweep transmission at the transmitted starting time.

A particular embodiment of the radio network node 200 according to the proposed technology provides a radio network node wherein the beam sweep transmission is a periodic beam sweep transmission.

Another possible embodiment of the proposed technology provides a radio network node 200 that is configured to transmit configuration information that also comprises information about the sequence of beams to be used in the beam sweep transmission and wherein radio network node is further configured to transmit information to be received by the wireless communication device 100 in a periodic beam sweep transmission with the sequence of beams.

FIG. 4 provides a block diagram illustration of a radio network node 200 according to the proposed technology. The radio network node 200 comprises a communication circuit 210, a processor 220 and a memory 230, the memory 230 comprising instructions executable by the processor 110, whereby the processor 220 is operative to initiate a transmission of configuration information enabling a wireless communication device 100 to receive information transmitted during a beam sweep transmission. A radio network node may also include a communication circuit 210. The communication circuit 210 may include functions for wired and/or wireless communication with other devices and/or network nodes in the network. In a particular example, the communication circuit 210 may be based on radio circuitry for communication with one or more other nodes, including transmitting and/or receiving information. The communication circuit 210 may be interconnected to the processor 220 and/or memory 230. By way of example, the communication circuit 210 may include any of the following: a receiver, a transmitter, a transceiver, input/output (I/O) circuitry, input port(s) and/or output port(s).

It will be appreciated that the methods and arrangements described herein can be implemented, combined and rearranged in a variety of ways. For example, embodiments may be implemented in hardware, or in software for execution by suitable processing circuitry, or a combination thereof.

The steps, functions, procedures, modules and/or blocks described herein may be implemented in hardware using any conventional technology, such as discrete circuit or integrated circuit technology, including both general-purpose electronic circuitry and application-specific circuitry.

Alternatively, or as a complement, at least some of the steps, functions, procedures, modules and/or blocks described herein may be implemented in software such as a computer program for execution by suitable processing circuitry such as one or more processors or processing units.

Examples of processing circuitry includes, but is not limited to, one or more microprocessors, one or more Digital Signal Processors (DSPs), one or more Central Processing Units (CPUs), video acceleration hardware, and/or any suitable programmable logic circuitry such as one or more Field Programmable Gate Arrays (FPGAs), or one or more Programmable Logic Controllers (PLCs).

It should also be understood that it may be possible to re-use the general processing capabilities of any conventional device or unit in which the proposed technology is implemented. It may also be possible to re-use existing software, e.g. by reprogramming of the existing software or by adding new software components.

It is also possible to provide a solution based on a combination of hardware and software. The actual hardware-software partitioning can be decided by a system designer based on a number of factors including processing speed, cost of implementation and other requirements.

Figure 5:
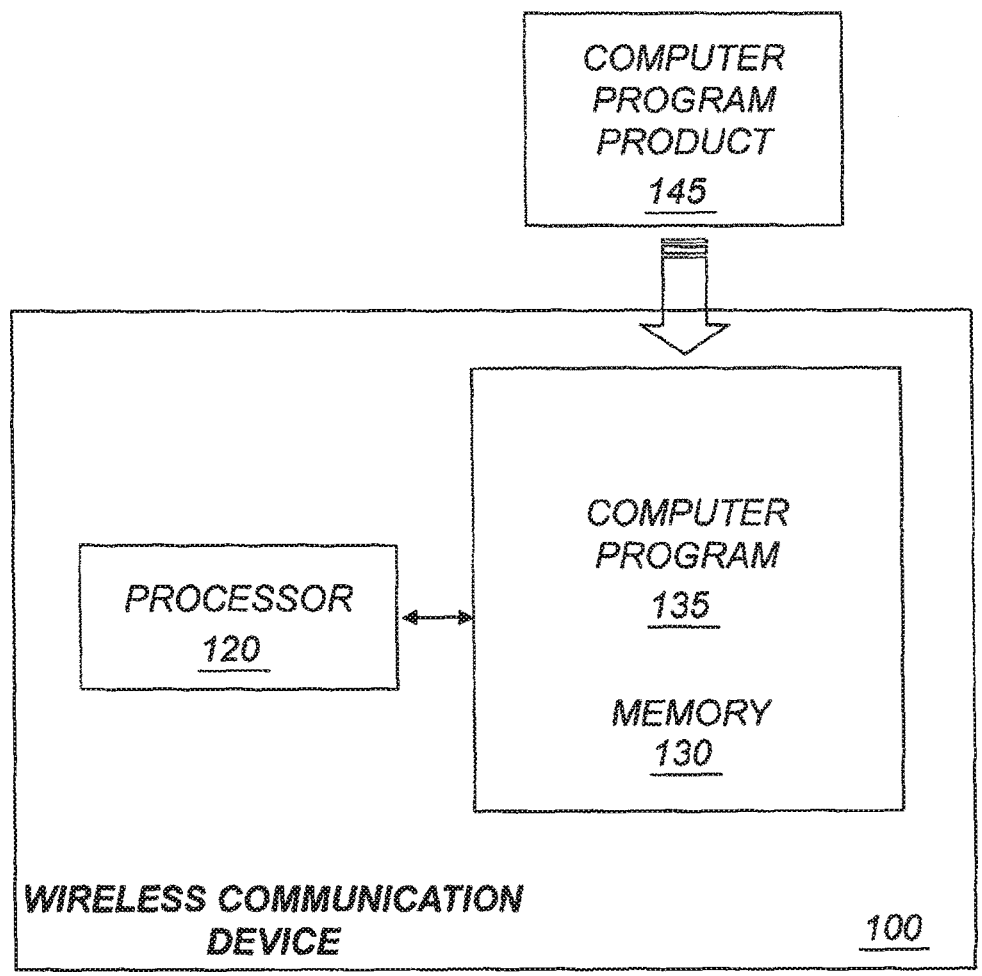
FIG. 5 is a computer program implementation of an embodiment of the proposed technology.

FIG. 5 is a schematic diagram illustrating an example of a computer-implementation according to an embodiment. In this particular example, at least some of the steps, functions, procedures, modules and/or blocks described herein are implemented in a computer program 135, which is loaded into the memory 130 for execution by processing circuitry including one or more processors 120. The processor(s) 120 and memory 130 are interconnected to each other to enable normal software execution. An optional input/output device may also be interconnected to the processor(s) 120 and/or the memory 130 to enable input and/or output of relevant data such as input parameter(s) and/or resulting output parameter(s).

The term 'processor' should be interpreted in a general sense as any system or device capable of executing program code or computer program instructions to perform a particular processing, determining or computing task.

The processing circuitry including one or more processors 120 is thus configured to perform, when executing the computer program 135, well-defined processing tasks such as those described herein.

The processing circuitry does not have to be dedicated to only execute the above-described steps, functions, procedure and/or blocks, but may also execute other tasks.

According to a particular embodiment of the proposed technology there is provided a computer program 135 which, when executed by at least one processor 120, control the reception of a beam sweep transmission, wherein the computer program 135 comprises instructions that cause the at least one processor to:

read information for determining whether a wireless communication device 100 is stationary, or essentially stationary read configuration information comprising information about the starting time for a beam sweep transmission determining a time to initiate a reception of the beam sweep transmission based at least partially on the information for determining whether a wireless communication device 100 is stationary, or essentially stationary, and the acquired configuration information; and initiate a reception of the beam sweep transmission at the determined time.

The proposed technology also provides a computer-program product comprising a computer-readable medium 145 having stored thereon a computer program 135 as described above.

The proposed technology also provides a carrier comprising the computer program, wherein the carrier is one of an electronic signal, an optical signal, an electromagnetic signal, a magnetic signal, an electric signal, a radio signal, a microwave signal, or a computer-readable storage medium.

By way of example, the software or computer program 135 may be realized as a computer program product, which is normally carried or stored on a computer-readable medium, in particular a non-volatile medium. The computer-readable medium may include one or more removable or non-removable memory devices including, but not limited to a Read-Only Memory (ROM), a Random Access Memory (RAM), a Compact Disc (CD), a Digital Versatile Disc (DVD), a Blu-ray disc, a Universal Serial Bus (USB) memory, a Hard Disk Drive (HDD) storage device, a flash memory, a magnetic tape, or any other conventional memory device. The computer program may thus be loaded into the operating memory of a computer or equivalent processing device for execution by the processing circuitry thereof.

The flow diagram or diagrams presented herein may be regarded as a computer flow diagram or diagrams, when performed by one or more processors. A corresponding apparatus may be defined as a group of function modules, where each step performed by the processor corresponds to a function module. In this case, the function modules are implemented as a computer program running on the processor.

The computer program residing in memory may thus be organized as appropriate function modules configured to perform, when executed by the processor, at least part of the steps and/or tasks described herein.

Figure 6:
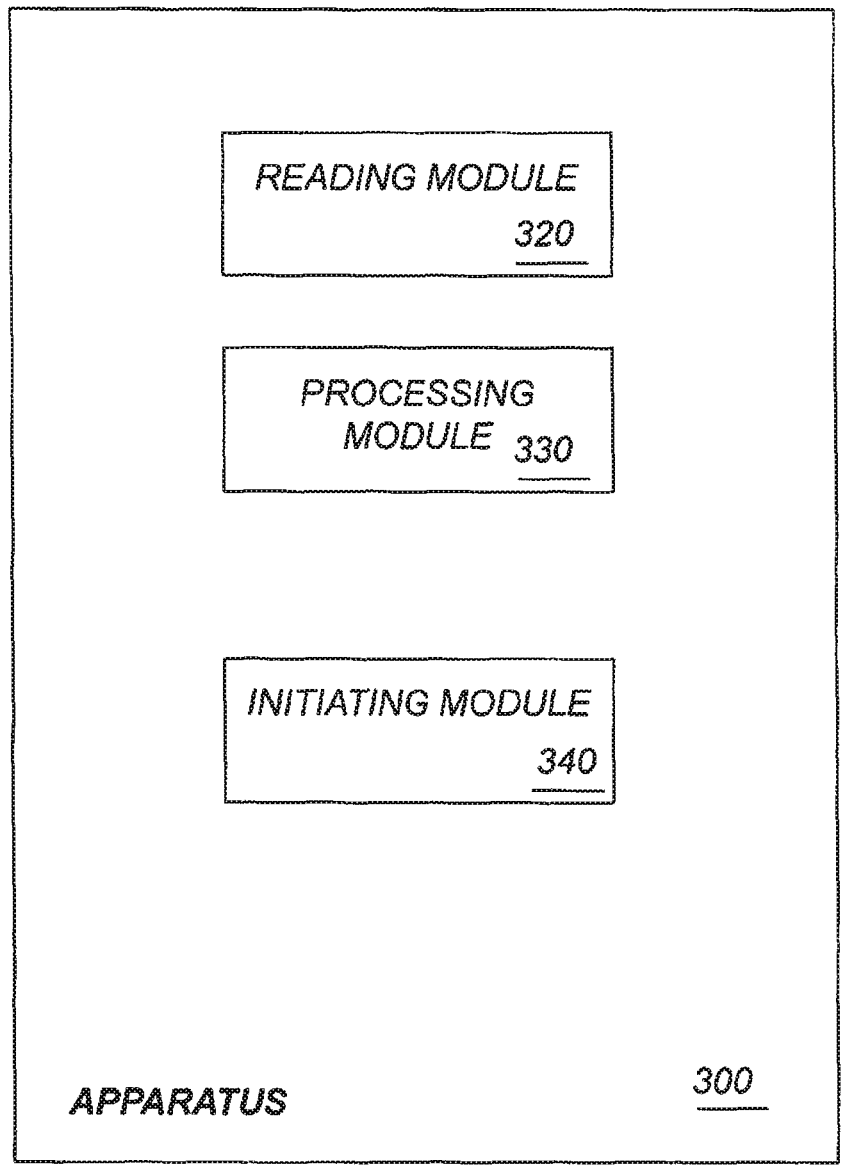
FIG. 6 is a diagram illustrating an apparatus comprising function modules according to the proposed technology.

FIG. 6 is a schematic diagram illustrating an example of an apparatus 300 for controlling a reception of a beam sweep transmission. The apparatus 300 comprises a reading module 310 for reading information for determining whether a wireless communication device 100 is stationary, or essentially stationary. The apparatus 300 also comprises a reading module 310 for reading configuration information comprising information about the starting time for the beam sweep transmission. The apparatus also comprises a processing module 320 for determining a time to initiate a reception of the beam sweep transmission based at least partially on the information for determining whether a wireless communication device 100 is stationary, or essentially stationary, and the acquired configuration information. The apparatus also comprises an initiation module 330 for initiating a reception of the beam sweep transmission at the determined time.

Alternatively it is possible to realize the module(s) in FIG. 6 predominantly by hardware modules, or alternatively by hardware, with suitable interconnections between relevant modules. Particular examples include one or more suitably configured digital signal processors and other known electronic circuits, e.g. discrete logic gates interconnected to perform a specialized function, and/or Application Specific Integrated Circuits (ASICs) as previously mentioned. Other examples of usable hardware include input/output (I/O) circuitry and/or circuitry for receiving and/or sending signals. The extent of software versus hardware is purely implementation selection.

The embodiments described above are merely given as examples, and it should be understood that the proposed technology is not limited thereto. It will be understood by those skilled in the art that various modifications, combinations and changes may be made to the embodiments without departing from the present scope as defined by the appended claims. In particular, different part solutions in the different embodiments can be combined in other configurations, where technically possible.

ABBREVIATIONS

3GPP 3rd Generation Partnership Project
5G 5th Generation
AIT Access Information Table
DRX Discontinuous Reception
eNB Evolved NodeB
EPS Evolved Packet System
GPS Global Positioning System
L3 Layer 3LTE Long Term Evolution
MTC Machine Type Communication
RAN Radio Access Network
RRC Radio Resource Control
SIB System Information Block
SSI System Signature Index
TA Tracking Area
TAC Tracking Area Code
TRAS Tracking RAN Area Signal
UE User Equipment

The invention claimed is:

1. A method performed by a wireless communication device to enable the reception of a beam sweep transmission, wherein the method comprises:

obtaining information enabling the wireless communication device to determine whether it is stationary;

acquiring configuration information comprising information about a starting time of the beam sweep transmission;

determining a time to initiate a reception of the beam sweep transmission based at least partially on the obtained information and the configuration information, thereby allowing the wireless communication device to enter, or remain in, a first activity state until the determined time; and entering, at the determined time, a second activity state, whereby the wireless communication device is prepared to receive the beam sweep transmission;

wherein, when the obtained information indicates that the wireless communication device is stationary, determining the time to initiate the reception of the beam sweep transmission comprises determining the time based on a time offset determined from an earlier beam sweep transmission, the time offset being between the starting time of the earlier beam sweep transmission and the reception by the wireless communication device of a beam of the earlier beam sweep transmission.

2. The method according to claim 1, wherein the first activity state is at least one of an idle state, a dormant state, an energy saving state and a non-receiving state, and wherein the second activity state is a receiving state.

3. The method according to claim 1, wherein acquiring the configuration information comprises receiving a message comprising the configuration information.

4. The method according to claim 3, wherein the message is transmitted from a radio network node that performs the beam sweep transmission.

5. The method according to claim 1, further comprising determining the time offset by comparing a time of reception registered by the wireless communication device with respect to the beam received in the previous beam sweep transmission with the starting time as indicated in the configuration information.

6. The method according to claim 5, wherein obtaining the information indicating whether the wireless communication device is stationary comprises obtaining time offsets for at least two different beam sweep transmissions and comparing the two different time offsets.

7. The method according to claim 1, wherein the step of obtaining information comprises obtaining one or more of the following:
information from a sensor device about the position of the wireless communication device that enables the wireless communication device to determine that it is stationary, by checking the information from the sensor device;
information related to handovers of the wireless communication device that enables the wireless communication device to determine that it is stationary, by checking whether it was subjected to a handover during a predetermined time period;
information related to estimations of certain channel properties, including dispersion or delay profile, that enables the wireless communication device to determine that it is stationary, by checking whether these channel properties have remained constant during a predetermined time period;
information related to estimations of a Doppler spread that enables the wireless communication device to determine that it is stationary, by checking whether the estimations of the Doppler spread; and
information about the geographical position of the wireless communication device provided by a user equipment (UE)-internal global positioning system (GPS) receiver that enables the wireless communication device to determine that it is stationary, by checking whether the information about the geographical position provides indications that the geographical position has remained constant during a predetermined time period.

8. The method according to claim 1, wherein information received in the beam sweep transmission comprises one or more of system information, paging information and other information that the wireless communication device needs to monitor when in the first activity state.

9. The method according to claim 1, further comprising receiving information in the beam sweep transmission comprising tracking area information instructing the wireless communication device to perform a tracking area update.

10. The method according to claim 1, wherein the configuration information also comprises information about a sequence of beams used in the beam sweep transmission.

11. The method according to claim 1, wherein the beam sweep transmission is a periodic beam sweep transmission.

12. The method according to claim 11, wherein the configuration information further comprises the periodicity of the periodic beam sweep transmission.

13. The method according to claim 12, wherein the method comprises determining a sequence of times to initiate reception of beam sweep transmissions based on the obtained information, the configuration information and the periodicity of the beam sweep transmissions.

14. The method according to claim 1, wherein the method comprises the further step of returning to the first activity state after having received information in the beam sweep transmission.

15. A wireless communication device configured to receive information transmitted during a beam sweep transmission, comprising:
communication circuitry configured to receive the information transmitted during a beam sweep transmission; and
processing circuitry operatively associated with the communication circuitry and configured to:
obtain information enabling the wireless communication device to determine whether it is stationary;
acquire configuration information comprising information about a starting time of the beam sweep transmission;
determine a time to initiate a reception of the beam sweep transmission based at least partially on the obtained information and the configuration information, thereby allowing the wireless communication device to enter, or remain in, a first activity state until the determined time; and
cause the wireless communication device to enter, at the determined time, a second activity state, whereby the wireless communication device is prepared to receive the beam sweep transmission;
wherein the processing circuitry is configured to, when the obtained information indicates that the wireless communication device is stationary, determine the time to initiate the reception of the beam sweep transmission by determining the time based on a time offset determined from an earlier beam sweep transmission, the time offset being between the starting time of the earlier beam sweep transmission and the reception by the wireless communication device of a beam of the earlier beam sweep transmission.

16. The wireless communication device according to claim 15, wherein the first activity state is at least one of an idle state, a dormant state, an energy saving state and a non-receiving state, and wherein the second activity state is a receiving state.

17. The wireless communication device according to claim 15, wherein the processing circuitry is configured to acquire the configuration information by receiving a message comprising the configuration information.

18. The wireless communication device according to claim 17, wherein the configuration information is received in a message transmitted from a radio network node that performs the beam sweep transmission.

19. The wireless communication device according to claim 15, wherein the processing circuitry is configured to determine the time offset by comparing a time of reception registered by the wireless communication device with respect to the beam received in the previous beam sweep transmission with the starting time as indicated in the configuration information.

20. The wireless communication device according to claim 19, wherein the processing circuitry is configured to obtain the information indicating whether the wireless communication device is stationary by obtaining time offsets for at least two different beam sweep transmissions and comparing the two different time offsets.

21. The wireless communication device according to claim 15, wherein the processing circuitry is configured to obtain information in the form of one or more of the following:
- information from a sensor device about the position of the wireless communication device that enables the wireless communication device to determine that it is stationary, by checking the information from the sensor device;
- information related to handovers of the wireless communication device that enables the wireless communication device to determine that it is stationary, by checking whether it was subjected to a handover during a predetermined time period;
- information related to estimations of certain channel properties, including dispersion or delay profile, that enables the wireless communication device to determine that it is stationary, by checking whether these channel properties have remained constant during a predetermined time period;
- information related to estimations of a Doppler spread that enables the wireless communication device to determine that it is stationary, by checking whether the estimations of the Doppler spread; and
- information about the geographical position of the wireless communication device provided by a user equipment (UE)-internal global positioning system (GPS) receiver that enables the wireless communication device to determine that it is stationary, by checking if the information about the geographical position provides indications that the geographical position has remained constant during a predetermined time period.

22. The wireless communication device according to claim 15, wherein the information received in the beam sweep transmission comprises one or more of system information, paging and other information that the wireless communication device needs to monitor when in the first activity state.

23. The wireless communication device according to claim 15, wherein the processing circuitry is configured to receive information in the beam sweep transmission comprising tracking area information instructing the wireless communication device to perform a tracking area update.

24. The wireless communication device according to claim 15, wherein the configuration information also comprises information about a sequence of beams used in the beam sweep transmission.

25. The wireless communication device according to claim 15, wherein the beam sweep transmission is a periodic beam sweep transmission.

26. The wireless communication device according to claim 25, wherein the processing circuitry is configured to acquire configuration information that comprises the periodicity of the periodic beam sweep transmission.

27. The wireless communication device according to claim 26, wherein the processing circuitry is configured to determine a sequence of times to initiate a reception based on the obtained information, the configuration information and the periodicity of the beam sweep transmission.

28. The wireless communication device according to claim 15, wherein the processing circuitry is configured to return the wireless communication device to the first activity state after having received the information in the beam sweep transmission.

* * * * *